US012646476B2

(12) United States Patent
Nick

(10) Patent No.: US 12,646,476 B2
(45) Date of Patent: Jun. 2, 2026

(54) PERFORMING COMPUTING OPERATIONS USING A COLLECTIVE PROPERTY OF ELECTROMAGNETIC ENERGY OBSERVED THROUGH TRANSPARENT DISPLAYS BACKGROUND

(71) Applicant: Microsoft Technology Licensing, LLC, Redmond, WA (US)

(72) Inventor: Teresa A. Nick, Towson, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/737,539

(22) Filed: Jun. 7, 2024

(65) Prior Publication Data

US 2025/0322802 A1 Oct. 16, 2025

Related U.S. Application Data

(60) Provisional application No. 63/634,267, filed on Apr. 15, 2024.

(51) Int. Cl.
*G09G 3/34* (2006.01)
*G09G 5/02* (2006.01)

(52) U.S. Cl.
CPC ............. *G09G 3/3426* (2013.01); *G09G 5/02* (2013.01); *G09G 2300/046* (2013.01)

(58) Field of Classification Search
CPC ... G09G 3/3426; G09G 5/02; G09G 2300/046
See application file for complete search history.

(56) References Cited

U.S. PATENT DOCUMENTS

| | | | | |
|---|---|---|---|---|
| 2007/0132710 A1* | 6/2007 | Tateuchi | G09G 3/3406 | 345/102 |
| 2009/0109165 A1* | 4/2009 | Park | G09G 3/3426 | 345/589 |
| 2014/0240203 A1* | 8/2014 | Leclerc | A63J 25/00 | 345/1.3 |
| 2015/0373793 A1* | 12/2015 | Bower | F21V 9/08 | 362/20 |
| 2018/0277046 A1* | 9/2018 | Lang | G09G 3/3426 | |
| 2021/0406668 A1 | 12/2021 | Hack | | |

OTHER PUBLICATIONS

Aljundi, et al., "Memory Aware Synapses: Learning What (not) to Forget", Springer, 2018, pp. 144-161.
Kirkpatrick, et al., "Overcoming catastrophic forgetting in neural networks", arXiv:1612.00796, Jan. 25, 2017, 13 pages.
Zenke, et al., "Improved multitask learning through synaptic intelligence", arXiv:1703.04200, Apr. 10, 2017, 9 pages.

(Continued)

*Primary Examiner* — Towfiq Elahi
(74) *Attorney, Agent, or Firm* — Ray Quinney & Nebeker P.C.; Paul N. Taylor

(57) ABSTRACT

A computing system includes a plurality of processing units and a plurality of emitters. Each emitter is coupled to at least one of the plurality of processing units and is configured to display an electromagnetic signal at a location of the emitter based on instructions from an associated processing unit. The computing system further includes an electromagnetic sensor configured to detect a collective electromagnetic signal from the plurality of emitters.

20 Claims, 7 Drawing Sheets

(56) References Cited

OTHER PUBLICATIONS

Bahl, Victor., "Unlocking the Potential of In-network Computing for Telecommunication Workloads", Retrieved From: https://azure.microsoft.com/en-us/blog/unlocking-the-potential-of-in-network-computing-for-telecommunication-workloads/, Sep. 7, 2023, 5 Pages.
Extended European Search Report Received in European Patent Application No. 25170509.1 mailed on Sep. 18, 2025, 09 pages.

* cited by examiner

300

400

PERFORMING COMPUTING OPERATIONS USING A COLLECTIVE PROPERTY OF ELECTROMAGNETIC ENERGY OBSERVED THROUGH TRANSPARENT DISPLAYS BACKGROUND

CROSS REFERENCE TO RELATED APPLICATIONS

This application claims priority to and the benefit of U.S. Provisional Patent Application No. 63/634,267, filed on Apr. 15, 2024, which are hereby incorporated by reference in their entireties.

BACKGROUND

Artificial intelligence is used to perform complex tasks such as reading comprehension, language translation, image recognition, or speech recognition. Artificial intelligence systems, such as those based on Natural Language Processing (NLP), Recurrent Neural Networks (RNNs), Convolutional Neural Networks (CNNs), Long Short-Term Memory (LSTM) neural networks, or Gated Recurrent Units (GRUs) have been deployed to perform such complex tasks. In many such systems, model parallelism is used to accelerate operations associated with the model. Model parallelism requires splitting the model across several processing units (e.g., GPUs). The splitting of the model requires all-to-all communication among the model portions (e.g., neurons or layers). Communication latencies among the processing units can degrade the performance of artificial intelligence systems during both inference and training. In addition, the energy cost and the memory load during communication in large clusters is greater than that during computation.

Accordingly, there is a need for systems and methods that reduce communication data volumes and latencies while performing collective operations.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
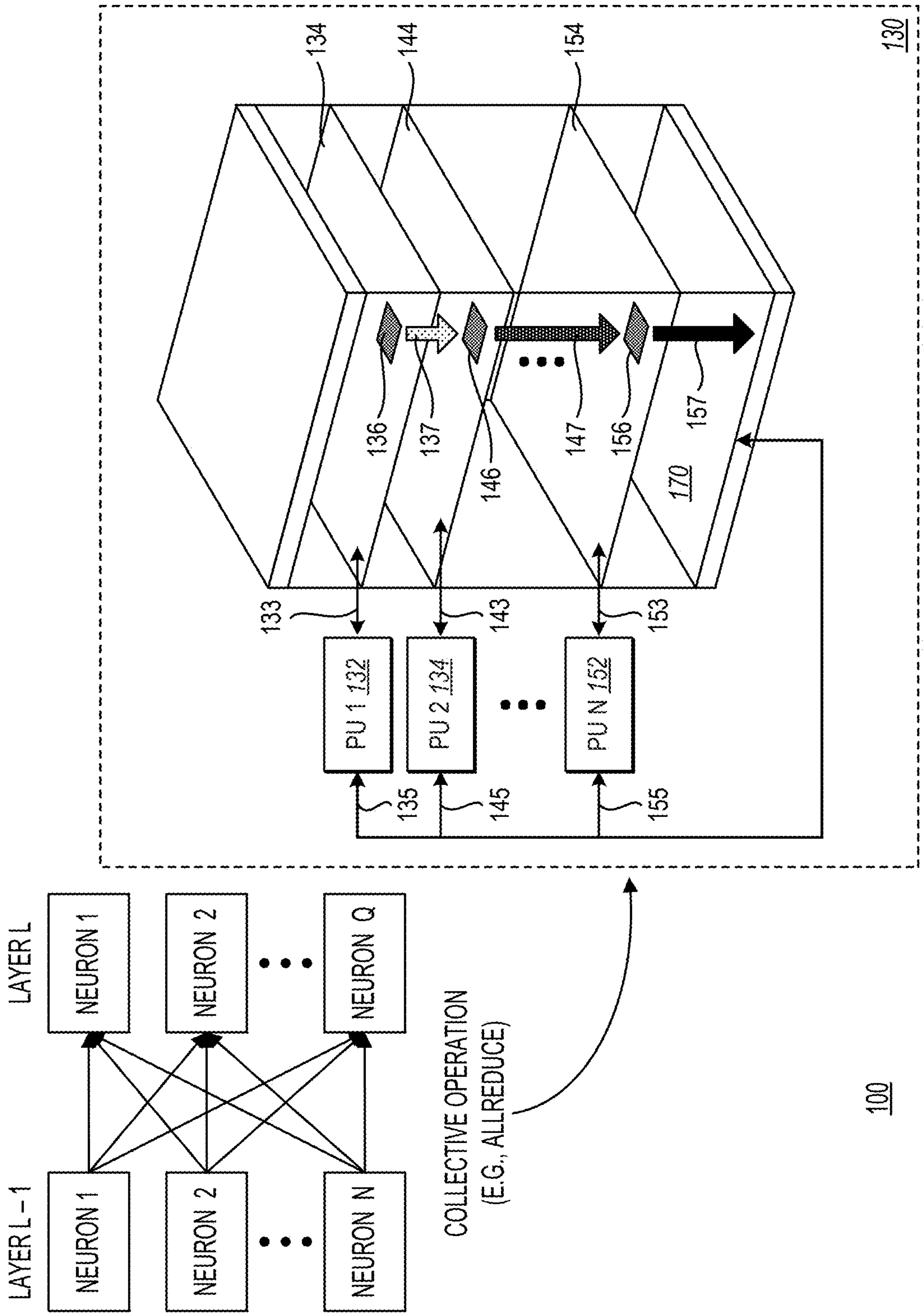
FIG. 1 is an example system environment for performing collective operations using a property of electromagnetic energy, according to at least one embodiment of the present disclosure.

The present disclosure relates to performing collective operations associated with an artificial intelligence (AI) model using a property of electromagnetic energy. Artificial intelligence is used to perform complex tasks such as reading comprehension, language translation, image recognition, or speech recognition. Artificial intelligence systems, such as those based on Natural Language Processing (NLP), Recurrent Neural Networks (RNNs), Convolutional Neural Networks (CNNs), Long Short-Term Memory (LSTM) neural networks, or Gated Recurrent Units (GRUs) have been deployed to perform such complex tasks. Certain examples relate to artificial intelligence systems in which the layers, sublayers, or even smaller portions of the AI model are partitioned to achieve model parallelism. As an example, in model parallelism, different processing units in the system may be responsible for the computations in different parts of a single network. For example, each layer, sublayer, or even a smaller portion of the neural network may be assigned to a different processing unit in the system. Thus, as part of model parallelism, the neural network model may be split among different processing units (e.g., CPUs, GPUs, IPUs, FPGAs, or other types of such units). In some embodiments, each processing unit may use at least a portion of the same data. The splitting of the model requires all-to-all communication among the model portions (e.g., the neurons associated with the various neural network layers). Communication latencies and data volumes among the processing units can degrade the performance of artificial intelligence systems during both inference and training.

Certain examples in this disclosure further relate to communicating among processing units using electromagnetic energy to perform collective operations, such as those associated with an artificial intelligence (AI) model. Collective operations include operations that allow collection of data from different processing units for combining into a result for (the same or different) processing units. For example, data from processing units (e.g., GPUs) associated with one portion of the AI system may be combine them into a result for another portion of the AI system. As an example, during inference a layer of an AI model provides results of the computation by neurons in that layer to the neurons for the next layer. This means that all of the computations from a layer (e.g., layer L−1) would have to be supplied to each processing unit that would perform the next layer's (layer L) computations. As used herein the term "neuron" refers to a connection point in an artificial intelligence system having layers for processing inputs and providing outputs, where the connection point has the capability to receive an input and provide an output to other connection points in the AI system.

Similarly, during training as part of backpropagation, model parameters are synchronized by exchanging updated gradients. Parameter updates are applied during backpropagation. Thus, during training as part of a backward pass a layer of an AI model provides results of the computation by neurons in that layer to the neurons for the previous layer. As an example, the gradient of a loss function with respect to the weights in the network (or a portion of the network) is calculated. The gradient is then fed to an optimization method that uses the gradient to update the weights to minimize the loss function. The goal with backpropagation is to update each of the weights (or at least some of the weights) in the network so that they cause the actual output to be closer to the target output, thereby minimizing the error for each output neuron and the network as a whole.

In one example, using the systems and methods described herein, the summation of activation weights can be processed using the "AllReduce" collective operation in one step. In some instances, control planes may not be necessary because the processing units can either be pre-programmed to process a defined part of the model (inference) or self-organize and parallelize the model based on the size of their allotted data partition (training). Although transmission bandwidth as described herein may be limited by visible light peripherals, such as displays and image sensors operating based on visible light, that are optimized for relatively slow human vision, this limit does not present a technological barrier. For example, in some embodiments, peripherals for generating electromagnetic energy signals (e.g., displays) and for receiving or sensing electromagnetic energy signals (e.g., image or light sensors) may be implemented which may operate based on electromagnetic energy that is not in the visible spectrum and/or optimized for speeds above that which human vision can detect. For instance, electromagnetic energy from at least infrared rays to ultraviolet rays, including visible light, may be used with the systems and methods described herein. In terms of wavelength, the electromagnetic energy may range from nanometers (e.g., 400 nanometers) to a few microns (e.g., 1.6 microns). The specific range of wavelength that is used will depend on the type of displays, sensors, or other such equipment being used for the communication of the electromagnetic energy. As an example, radiofrequency waves in a range of 3 kHz to 300 MHz may be used. As another example, microwaves in a range of 300 MHz to 300 GHz may also be used. Depending on the frequency, and thus the wavelength, of the electromagnetic energy being used, the equipment used for communicating such signals may be tailored.

FIG. 1 is an example system environment 100 for performing collective operations using collective properties of electromagnetic energy, according to at least one embodiment of the present disclosure. For example, the system environment 100 may be implemented for performing collective operations associated with artificial intelligence (AI) by using properties of electromagnetic energy signals that may collectively interact to form a resulting signal having a collective property. System environment 100 may relate to an artificial intelligence system that, once trained, can be used for predicting outputs as part of inference.

System environment 100 shows the model as including layers L−1 and L, where layer L−1 includes several neurons (neuron 1, neuron 2, and neuron N) and layer L includes several neurons (neuron 1, neuron 2, and neuron Q). For neuron 1 in layer L, the activation is equal to an activation function (Ø) on the sum of all weighted inputs (aw) to neuron 1 with some bias $$b: a_1^{(l)} = \varnothing\left(a_0^{(l-1)}w_{0,1}^{(l)} + a_1^{(l-1)}w_{1,1}^{(l)} + \ldots + a_m^{(l-1)}w_{m,1}^{(l)} + b^{(l)}\right).$$

The inputs $$\left(\text{e.g., } a_0^{(l-1)}, a_1^{(l-1)}, \text{ and } a_m^{(l-1)}\right)$$

in this example are the set of values for which one needs to predict an output value. These can be viewed as features or attributes included in the data. The weights $$\left(\text{e.g., } w_{0,1}^{(l)}, w_{1,1}^{(l)}, \text{ and } w_{m,1}^{(l)}\right)$$

are values that are attached to each input to convey the importance of the corresponding input or feature in predicting the final output. The bias (e.g., $b^{(l)}$) can be used to shift the activation function towards left or right. The weights and the bias are parameters that have been learned during training of the AI model.

The activation function (e.g., Ø) is used to introduce non-linearity in the model and the summation function is used to bind the weights and inputs together. Examples of activation functions include rectified linear unit (ReLU) activation function, leaky ReLU, parametric ReLU, Gaussian-error linear unit (GELU) activation function, and other variants of ReLU. Moreover, aside from ReLU any other appropriate non-linear or linear activation functions may be used. In this example, in order to calculate the summation $$\left(a_1^{(l)}\right),$$

one needs information across all of layer L−1, even if the neurons in layer L−1 are partitioned across processing units as part of model parallelism. This means that in this example all of the layer L−1 activations would have to be supplied to each processing unit that would calculate layers L's $$a_1^{(l)} \text{ to } a_q^{(l)}.$$

The system environment 100 shows system 130, which is one example implementation for performing the collective operation as part of the AI system. System 130 includes several processing units (e.g., processing units PU 1 132, PU 2 142, and PU N 152). Each of the processing units can be a graphics processing unit (GPU). As explained earlier, the processing units can be implemented using other hardware options, as well. As an example, a processing unit may be implemented as one or more computer processing units (CPUs), field programmable gate arrays (FPGAs), application specific integrated circuits (ASICs), erasable and/or complex programmable logic devices (PLDs), programmable array logic (PAL) devices, or generic array logic (GAL) devices.

In this example, each of the processing units (PU) is further coupled to a transparent display (TD). Each TD may represent a singular display device or may represent multiple TD devices forming a TD layer coupled in conjunction with an associated PU. As an example, PU 1 132 is coupled via link 133 to a TD 134. PU 2 142 is coupled via link 143 to a TD 144. PU N 152 is coupled via link 153 to a TD 154. Each of links 133, 143, and 153 may be implemented as a display port link. Other high-speed links for connecting processing units to displays may also be used. While FIG. 1 shows an implementation of the system 130 with 3 TDs, other embodiments may implement other quantities of TDs. For example, in some cases the system 130 may be implemented with 2 layers of TDs. In another example, the system 130 may be implemented with 8 layers of TDs. Indeed, any number of TDs or layers of TD may be implemented in accordance with the techniques described herein.

Each TD is configured to display information (e.g., communicated to the TD from a PU) as electromagnetic energy at one or more emitters of the TD, such as on one or more pixels of the TD. Other configurations that aggregate part of the data before display are possible, depending on the model size and design. For example, all of the processing units in one server or one rack could share a TD. Additionally, as described herein, other configurations may include a transparent medium with emitters disposed through the transparent medium for displaying the electromagnetic energy as described herein.

The TD's may be display devices that can present visual information while maintaining a level of transparency through the display. For example, the TDs may be transparent organic light emitting diode (OLED) displays or transparent micro-LED displays. In some embodiments, the TDs may be transparent electronic ink (E-ink) or transparent electronic paper (E-paper) displays. The TDs may be any other display suitable for implementing the techniques described herein. The TDs may all be the same type of display device or may include multiple different types of display devices.

In some embodiments, the TDs may include one or more pixels that may present electromagnetic (e.g., visual) content with a resolution and brightness that may be observed (e.g., sensed, detected, or seen), and the pixels may simultaneously be (at least somewhat) transparent, or may allow at least some ambient, environmental, or background light (e.g., not originating from the display) through the pixels. The TDs may be transparent to any type of electromagnetic energy, such as visible light, infrared light, and/or ultraviolet light. In this way, each TD may be configured to present a blended image of image data generated and presented by the TD, as well as background images observable through the pixels of the TD (e.g., generated at another, background TD).

In some embodiments, the TDs may be aligned in one or more dimensions. For example, the TDs may each include a plurality of pixels, and the TDs may be positioned in a stacked or layered configuration such that corresponding pixels of each TD align vertically. In some embodiments, the TDs may be positioned such that some of the pixels align while others do not. In some embodiments, the TDs may be stacked such that one or more (or all) of the layers of TDs are adjacent and/or touching. In some embodiments, the TDs may be stacked with a gap between one or more of the layers of TDs. For example, the TDs may be layered with a gap of between 2 mm and 10 mm therebetween.

The TDs may each be independently and separately controlled by their associated PUs to generate and display distinct images, patterns, etc. For example, information such as a bit sequence encoding of an AI node activation may be presented on a TD as a specific image. For instance, a grid, array, or matrix of pixels of the TDs may be arranged and indexed to display encoded information as a spatiotemporal pattern on the pixels of the TD (e.g., as described in connection with FIG. 3). Each TD may be separately controlled to display a distinct image or pattern for presenting distinct information (e.g., activations) as provided by an associated PU. In this way, the various neurons or nodes of an AI model may present information (activations) through an image displayed on a corresponding TD. Additionally, one processor and/or TD may be associated with multiple (e.g., many) neurons of an AI model. Thus, the image or pattern displayed on the TD may be representative of several activations of the multiple neurons as encoded into the image of the TD. For instance, the TDs may include a grid or array of pixels, and each row or column of the grid may be associated with and may display a pattern representing an encoded activation for a distinct neuron. In this way, a single TD or layer may display activations for many neurons.

The system 130 includes an electromagnetic sensor 170 such as an image sensor or a visible light sensor. For example, the electromagnetic sensor 170 may be a semiconductor component capable of detecting and converting incident electromagnetic energy (e.g., light) into electrical signals. For instance, the electromagnetic sensor 170 may include photodiodes, phototransistors, or other components for capturing and quantifying a property of electromagnetic energy and accurately representing it as a digital or analogue signal. The electromagnetic sensor 170 may include a single sensor or may include multiple sensors or image-sensing devices such as a sensor array.

In some embodiments, each of the PUs may be coupled to the electromagnetic sensor 170. For example, PU 1 132 may be coupled to the electromagnetic sensor 170 via a link 135. PU 2 142 may be coupled to the electromagnetic sensor 170 via a link 145. PU N 152 may be coupled to the electromagnetic sensor 170 via a link 155. In this way, each of the PUs may receive or may access the information detected by the electromagnetic sensor 170. Each of links 135, 145, and 155 may be implemented as a peripherals component express (PCIe) link. Oher high-speed links for connecting processing units to sensors may also be used. In some embodiments, the electromagnetic sensor 170 may be coupled to one or more additional PUs, for example, in addition to or as an alternative to being coupled to one or more of the PUS 1 132, PU2 142, or PU N 152. For example, the electromagnetic sensor 170 may be coupled to PUs corresponding to another model layer of the AI model.

The electromagnetic sensor 170 and the TDs may be aligned such that the pixels of the TDs align with each other and such that the aligned pixels align with the electromagnetic sensor 170. For instance, the TDs may be stacked such that the pixels of the TDs align to form various sets of aligned pixels, (e.g., columns of layered pixels). The electromagnetic sensor 170 may thus be configured to observe the pixels in a given aligned set of pixels in a single or same direction, such as by observing (e.g., looking) through one or more pixels to see one or more pixels positioned behind another pixel and in this way see all of the pixels in the aligned set.

The stacked and aligned configuration of the TDs of the system 130 may facilitate observing collective electromagnetic signals through collective or aggregated properties of the electromagnetic signals displayed on one or more of the TDs. For example, as described above, each of the TDs may be independently controlled to display distinct images conveying distinct information (e.g., activations). Based on the information displayed by the various TDs, and based on the transparent nature of the TDs, the electromagnetic sensor 170 may detect a cumulative or collective signal representative of information from multiple or all of the stacked TDs.

As an illustrative example, TD 134 may display first information 136 via a pixel exhibiting a certain color, certain intensity, or other property of a given value as described herein. The first information 136 of the pixel may represent a bit in a sequence for conveying an activation of a first neuron of a layer of an AI model. The first information 136, when observed on TD 134 (e.g., from below TD 134, but not through any other TD) may accordingly be represented as a first electromagnetic signal 137.

Similarly, TD 144 may display second information 146 via a corresponding and aligned pixel exhibiting a (e.g., same or different) property of a given value as described herein. The second information 146 may represent a bit in a sequence for conveying a second activation of the same neuron or activation of a different neuron of the same or different layer of the AI model. Accordingly, a second electromagnetic signal 147 may be observed on TD 144 (e.g., from below TD 144) and, due to the transparent nature of TD 144 and due to the first information 136 displayed on TD 134 and the second information 146 displayed on TD 144, the second electromagnetic signal 147 may be inclusive, cumulative, and/or collective of the first information 136 and the second information 146. For example, the second electromagnetic signal 147 may be observed as the first information 136 and the second information 146 combined with or overlaid on each other.

Further, TD 154 may display third information 156 via a corresponding pixel exhibiting a (e.g., same or different) property of a given value as described herein. The third information 156 may represent a bit in a sequence for conveying an activation of the same neuron or activation of one or more different neurons of the same layer and/or one or more different neurons of a different layer of an AI model. Accordingly, a third electromagnetic signal 157 may be viewed on TD 154 (e.g., from below TD 154) and, due to the transparent nature of TD 154 and TD 144, and due to the first information 136 displayed via TD 134, the second information 146 displayed via TD 144, and the third information 156 displayed via TD 154, the third electromagnetic signal 157 may be inclusive, cumulative, and/or collective of the first information 136, the second information 146, and the third information 156. For example, the third electromagnetic signal 157 may be observed as the first information 136, the second information 146, and the third information 156 combined with or overlaid on each other. The third electromagnetic signal 157 may be a collective electromagnetic signal and may be representative of the cumulative image that the electromagnetic sensor 170 observes or detects (e.g., sees) on and/or through the various TDs.

In some embodiments, the TDs may all be the same type of TD and/or may all be operated with the same operational parameters, such as a same resolution, power, brightness, intensity, etc. In some embodiments, one or more the TDs may be a different type and/or may be operated with different operational parameters. For example, in some embodiments, a TD that is furthest from the electromagnetic sensor 170 may be operated at a higher power output, with a higher resolution, with a higher brightness, and/or with a higher intensity. This may help to minimize, avoid, or otherwise compensate for electromagnetic distortion, loss, or noise from the pixels being positioned further from the electromagnetic sensor 170 and/or the displayed information being observed through one or more additional TDs. In some embodiments, different types of TDs and/or different operational parameters may be implemented progressively for different TD layers as they progressively are positioned further from the electromagnetic sensor 170. In some embodiments, a top layer or top TD (e.g., furthest from the electromagnetic sensor 170) may not be transparent. This may facilitate providing increased brightness, power, resolution, intensity, etc., at the top-most layer and/or may facilitate preventing a background image from being observed through all of the layers of TDs and thus interfering with the collective electromatic signal observed by the electromagnetic sensor 170.

In some embodiments, the pixels of a TD may be adjacent and/or touching. In some embodiments, one or more pixels of a TD may be separated, divided, or otherwise disconnected from one or more other pixels. For example, a gap or space may exist between adjacent pixels. This may facilitate isolating the information and/or signal displayed on a given pixel from interfering or bleeding into a neighboring pixel (e.g., as observed or sensed from below the TD). In some embodiments, the pixels may be separated by one or more barriers, walls, or shades in order to isolate the information displayed on each pixel. For instance, barriers may extend between different TDs or layers of TDs in order to isolate stacks or columns of pixels and in this way more accurately highlight or focus the information for an aligned set of pixels onto a corresponding location of the electromagnetic sensor 170.

In this way, information may be presented via the TDs (e.g., any number of stacked or layered TDs) and the resulting information or collective electromagnetic signal sensed by the electromagnetic sensor 170 may be a combination of information presented or displayed on one or more (or all) of the TD layers. For instance, the third electromagnetic signal 157 may exhibit one or more collective properties cumulative of the properties of the first information 136, second information 146, and third information 156. For example, the third electromagnetic signal 157 may be a certain color resulting from the combination of the colors of the first information 136, second information 146, and third information 156. The third electromagnetic signal 157 may be a certain electromagnetic intensity or luminosity resulting from the combination of the electromagnetic intensities of the first information 136, second information 146, and third information 156. The third signal may indicate any property (or properties) resulting from the collective information presented on the associated layers of TDs as described herein.

In some cases, each of the TDs may display information for contributing to a resulting collective electromagnetic signal at the electromagnetic sensor 170. In some embodiments, less than all of the TDs or only 1 TD may display information (e.g., one or more TDs may display a blank pixel). The resulting property and/or property value detected by the electromagnetic sensor 170 may correlate with an associated encoding (e.g., a bit, trit, or other quantity-based encoding scheme) as described herein, for example, in connection with FIG. 3.

The system 130 may be implemented in this way to present distinct images on each TD using any (or all) pixels of the TDs in order that the electromagnetic sensor 170 may observe or sense many cumulative (e.g., summed) electromagnetic signals from contributions of the multiple layers. In this way, a set of activations for a given neuron (or a set of many neurons) may be displayed on a TD layer as one or more multi-bit sequences, and additional sets of activations for additional neurons (or sets of neurons) may be displayed on additional TD layers of the system 130 in order that the electromagnetic sensor 170 may detect collective activations of the multiple sets of neurons as a plurality of collective electromagnetic signals.

The system 130 implemented in this way may advantageously reduce a computational expense typically involved in training and/or implementing AI models. For example, as described herein, computations involving information from multiple neurons may typically be achieved by the multiple neurons transmitting the information to another neuron, which may then perform the computation based on the received information. The additional neuron may also return the computational result back to the multiple neurons and in this way the backpropagation and weight-adjustment techniques of the AI model may be achieved. By implementing the stacked TD architecture of the system 130, however, computations may be performed on information passively and/or through the communication of the information itself. For example, the displaying of the neuron activations themselves as layered, transparent yet observable pixel encodings may innately perform a representative computation through the resulting collective property of the collective electromagnetic signal observed by the electromagnetic sensor 170. Thus, the PUs may receive the computational result, as the collective electromagnetic signal detected by the electromagnetic sensor 170, without a computing component (e.g., a processing unit) having actually performed the associated computation, but rather based on only transmitting (displaying) the information.

The techniques described herein may accordingly provide efficiency, power, latency, etc., benefits over conventional AI computation techniques. For example, traditional AI computation techniques may rely on n-to-n data transfer corresponding to n number of summations. The system 130, however may utilize innate and collective properties of electromagnetic signals to leverage computations on neuron activation data together with the transmission of the data as a single process or single step. Thus, the system 130 may provide improvements over traditional AI computation techniques by providing n-to-1 data transfer corresponding to n number of summations.

Each PU may be configured to process one or more neurons associated with a layer. As an example, assuming there are 256 neurons in layer L, PU 1 132 may be configured to process a subset of the 256 neurons, PU 2 142 may be configured to process the next subset of the 256 neurons, and finally PU N 152 may be configured to process the last subset of the 256 neurons. Partitioning may be performed using code configured to partition the model based on machine language frameworks, such as Tensorflow, Apache MXNet, and Microsoft® Cognitive Toolkit (CNTK). Thus, the various layers of the model may be assigned for processing using different processing units. This way the various parameters associated with layers may be processed in parallel.

In one example, the neural network model may include many layers and each layer may be encoded as matrices or vectors of weights expressed in the form of coefficients or constants that have been obtained via training of a neural network. Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_c = \sigma(W_{xi}xt + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

-continued $$c_t = f_tc_{t-1}i_t\tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t\tanh(c_t)$$

In this example, inside each LSTM layer the inputs and hidden states may be processed using a combination of vector operations (e.g., dot-product, inner product, and/or vector addition) and/or non-linear functions. In certain cases, the most computationally intensive operations may arise from the dot products, which may be implemented using dense matrix-vector and matrix-matrix multiplication routines.

Although FIG. 1 shows system 130 as including certain components that are arranged in a certain manner, system 130 may include additional or fewer components arranged differently. System 130 and the associated models can be deployed in cloud computing environments. Cloud computing may refer to a way for enabling on-demand network access to a shared pool of configurable processing units. For example, cloud computing can be employed in the marketplace to offer ubiquitous and convenient on-demand access to the shared pool of configurable processing units. The shared pool of configurable processing units can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

In some embodiments, the system 130 may be implemented as a transparent substrate or transparent medium (or multiple substrates or media) throughout which a plurality of emitters are positioned for displaying the information as described above at each emitter and thereby transmitting an electromagnetic signal from the emitters. For example, a transparent substrate such as a volume of glass, acrylic, or other translucent medium may have a plurality of LEDs or other electromagnetic emitters distributed throughout for displaying or otherwise presenting electromagnetic energy at given locations of the transparent substrate having one or more given properties (e.g., color, luminosity, etc.) as described herein. A plurality of PUs may be coupled to the emitters such that each PU may control and/or operate a set of emitters for displaying or presenting neuron activations as described herein. Moreover, a plurality of electromagnetic sensors and/or sensing components may be disposed on any or all sides of the transparent substrate. In some embodiments, electromagnetic sensors may be positioned and/or disposed within the transparent substrate, similar to the emitters. In this way, each PU may be operatively coupled to a cloud of emitters for displaying neural activation information, which clouds of emitters may overlap in 3-dimensional space. Additionally, electromagnetic sensors disposed within the transparent substrate may additionally form a cloud of sensors which may also overlap in 3-dimensional space the cloud(s) of emitters for monitoring and/or detecting collective electromagnetic signals from the cloud(s) of emitters in a similar manner to that described herein.

The transparent substrate may provide a computational space that is robust and flexible. For example, the electromagnetic sensors may sense collective electromagnetic signals and accordingly detect collective operations from a variety of different combinations of emitters, from a variety of different angles through the substrate, and/or from different combinations of PUs and/or neural activations. The emitters associated with a given PU may not necessarily be distributed adjacent and/or together (such as in a planar, TD configuration), but may be distributed in any manner (e.g., in a cloud) throughout the 3-dimensional volume of the transparent substrate. In this way, the emitters distributed throughout the transparent substrate may function similar to synapses of the human nervous system, and accordingly the AI model may learn and/or be taught to operate similar to that of the human brain, with excitatory, inhibitory, and neuromodulator inputs deferentially impacting outputs across multiple dimensions, including temporal dimensions.

Figure 2:
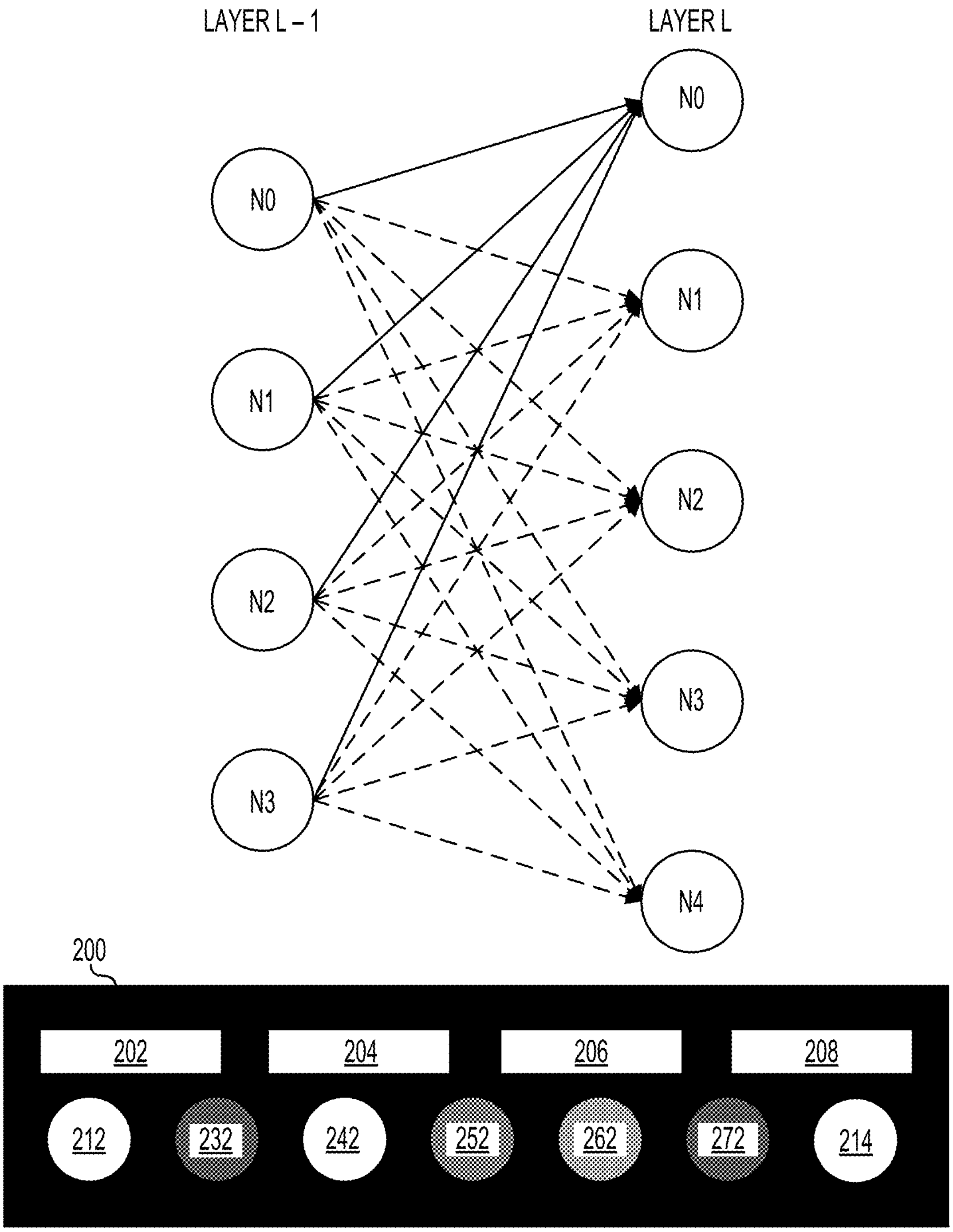
FIG. 2 shows an example set of signals that are communicated using electromagnetic energy to perform collective operations, according to at least one embodiment of the present disclosure.

FIG. 2 shows an example set of signals 201 that are communicated using electromagnetic energy as described herein to perform collective operations, such as those associated with artificial intelligence, according to at least one embodiment of the present disclosure. To explain the signals 201, four neurons N0, N1, N2, and N3 are shown for layer L−1 and five neurons N0, N1, N2, N3, and N4 are shown for layer L. This example relates to inference and shows the use of the electromagnetic energy in the context of signals being communicated from each of the four neurons N0, N1, N2, and N3 of layer L−1 to neurons of layer L. Accordingly, the weights (w) and bias (b) are known and can simply be stored local to the processing unit corresponding to the neurons. Thus, in this example, only the new input data to be processed by the neurons in layer L needs to be sent from each of the neurons of layer L−1 to neuron N0 of layer L. Neuron N0 of layer L needs to compute $$a_1^{(l)} = \Phi\left(a_0^{(l-1)}w_{0,1}^{(l)} + a_1^{(l-1)}w_{1,1}^{(l)} + a_2^{(l-1)}w_{2,1}^{(l)} + a_3^{(l-1)}w_{3,1}^{(l)} + b^{(l)}\right).$$

To enable this computation, neuron N0 of layer L−1 needs to send the value of $$a_0^{(l-1)}w_{0,1}^{(l)}$$

to neuron N0 of layer L. Neuron N1 of layer L−1 needs to send the value of $$a_1^{(l-1)}w_{1,1}^{(l)}$$

to neuron N0 of layer L. Neuron N2 of layer L−1 needs to send the value of $$a_2^{(l-1)}w_{2,1}^{(l)}$$

to neuron N0 of layer L. Neuron N3 of layer L−1 needs to send the value of $$a_3^{(l-1)}w_{3,1}^{(l)}$$

to neuron N0 of layer L. Neuron N0 to neuron N4 of layer L need to communicate the activation sum signals to the next layer of the model.

With continued reference to FIG. 2, in this example, the luminous intensity of the electromagnetic energy (e.g., the luminous intensity of visible light) is used to communicate data from each of the neurons (N0, N1, N2, and N3 of layer L−1) to the neurons associated with the next layer (layer L). Electromagnetic sensor 200 shows example sensed signals communicated by a processing unit and associated TD (e.g., any of the processing units and TDs described earlier with respect to FIG. 1). In this example, three types of signals are shown as detected by electromagnetic sensor 200. These include individual reference signals 202, 204, 206, and 208, population reference signals 212 and 214, and population sum signals 232, 242, 252, 262, and 272. The location of each signal on electromagnetic sensor 200 (e.g., the pixel location or pixel coordinates of each signal as displayed on an associated TD) provides additional information, including as an example, the source of the signal and/or the purpose of the signal. Some of these signals facilitate communication among processing units and others communicate actual data used by the next layer for computation. The reference signals can be viewed as metadata or header information. As an example, each individual reference signal (e.g., 202) indicates whether a particular layer L−1 neuron has voted. Thus, the sensed light at electromagnetic sensor 200 in the left most and top-most location indicates that neuron N0 of layer L−1 has voted. Individual reference signals 202, 204, 206, and 208 may also enable population tracking of missing tensor slices and processing units, as well. Moreover, such signals may allow normalization of the signals across the processing units (e.g., GPUs). In other examples, the individual reference signals 202, 204, 206, and 208 may be used for various ways to facilitate communication and calibration of system 130 of FIG. 1. As another example, CPU-based applications can use "efference copy" feedback to adjust luminance, color, or other electromagnetic properties across the processing units and corresponding TDs during the setting up and/or periodic calibration of system 130 of FIG. 1. As an example, during communication of the electromagnetic energy (e.g., via a TD) a sender can simultaneously transmit and check what is being sent, and then adjust based on the feedback. Thus, if the sender is expecting to display a piece of data, but somehow the sensed signal becomes obstructed, the sender will not see the data at the electromagnetic sensor that it expected to see. Based on this "efference copy" feedback, the sender can display the data at another spot on the TD corresponding to another spot on the electromagnetic sensor until the feedback confirms that what is being sent is indeed being sensed at the right spot on the electromagnetic sensor 200.

A population reference signal (e.g., 212) is a result of electromagnetic energy (e.g., visible light) being displayed by those neurons that are participating in the collective operation. The maximum luminous intensity associated with the population reference signal indicates that all of the neurons from a layer (e.g., layer L−1) are participating as part of the collective operation. The population reference signals 212 and 214 can also be used for calibration of the property of the electromagnetic energy across the processing units. In addition, the population reference signals 212 and 214 can also be used for the alignment of the displayed information with the electromagnetic sensor 200. The population reference signals 212 and 214 may also be used to monitor signal drift through the amplitude of a population of neurons, which may also be viewed as the population of the tensor slices, which are participating in a collective operation being performed as part of system 130 of FIG. 1.

The population reference signals 212 and 214 may also be used to track the population of the processing units that are participating in a collective operation being performed as part of system 130 of FIG. 1. Electromagnetic sensor 200 shows redundant population reference signals. Thus, both population reference signals 212 and 214 are communicating the same information in a redundant manner. There are several situations in which the population reference signals 212 and 214 and the individual reference signals 202, 204, 206, and 208 can be useful during system setup and management. As an example, there may be a situation where a processing unit has a system fault or has a lot more data to process than it can handle, and thus that processing unit may be unable to participate in the collective operation. Thus, the use of these signals is a way of telling the receiving layer everybody has checked in. The individual reference signals can also be helpful in determining if there is a TD (or pixel of a TD) that is faulty, inoperable, inaccurate, imprecise, or that has another type of fault. For example, if one of the individual reference signals (e.g., any of 202, 204, 206, and 208) is lighter or darker than the others and if each one of them is calibrated to have the same luminous intensity, then it indicates that there is a problem in the system that needs to be addressed before using the system.

The population sum signals 232, 242, 252, 262, and 272 provide information for use with the neurons in the next layer. Each of the neurons associated with layer L−1 displays electromagnetic energy (e.g., visible light), whose property (e.g., intensity) is proportional to that neuronal connection's weighted activation, at a specific pixel location of the associated TDs and electromagnetic sensor 200. As an example, population sum signal 232 is a result of the summation of the weighted activation signals $$\left(\text{e.g., } a_0^{(l-1)}w_{0,1}^{(l)},\ a_1^{(l-1)}w_{1,1}^{(l)},\ a_2^{(l-1)}w_{2,1}^{(l)},\ \text{and } a_3^{(l-1)}w_{3,1}^{(l)}\right)$$

received from all four neurons (N0, N1, N2, and N3) of layer L−1 at the specific position of the electromagnetic sensor 200 that is associated specifically with population sum signal 232. Population sum signal 242 is a result of the summation of the weighted activation signals $$\left(\text{e.g., } a_0^{(l-1)}w_{0,2}^{(l)},\ a_1^{(1-1)}w_{1,2}^{(l)},\ a_2^{(l-1)}w_{2,2}^{(l)},\ \text{and } a_3^{(l-1)}w_{3,2}^{(l)}\right)$$

received from all four neurons (N0, N1, N2, and N3) of layer L−1 at another specific position of the electromagnetic sensor 200 that is associated specifically with population sum signal 242. Population sum signal 252 is a result of the summation of the weighted activation signals $$\left(\text{e.g., } a_0^{(l-1)}w_{0,3}^{(l)},\ a_1^{(l-1)}w_{1,3}^{(l)},\ a_2^{(l-1)}w_{2,3}^{(l)},\ \text{and } a_3^{(l-1)}w_{3,3}^{(l)}\right)$$

received from all four neurons (N0, N1, N2, and N3) of layer L−1 at another specific position of the electromagnetic sensor 200 that is associated specifically with population sum signal 252. Population sum signal 262 is a result of the summation of the weighted activation signals $$\left(\text{e.g., } a_0^{(l-1)}w_{0,4}^{(l)},\ a_1^{(l-1)}w_{1,4}^{(l)},\ a_2^{(l-1)}w_{2,4}^{(l)},\ \text{and } a_3^{(l-1)}w_{3,4}^{(l)}\right)$$

received from all four neurons (N0, N1, N2, and N3) of layer L−1 at another specific position of the electromagnetic sensor 200 that is associated specifically with population sum signal 262. Finally, population sum signal 272 is a result of the summation of the weighted activation signals $$\left(\text{e.g., } a_0^{(l-1)}w_{0,5}^{(l)},\ a_1^{(l-1)}w_{1,5}^{(l)},\ a_2^{(l-1)}w_{2,5}^{(l)},\ \text{and } a_3^{(l-1)}w_{3,5}^{(l)}\right)$$

received from all four neurons (N0, N1, N2, and N3) of layer L−1 at another specific position of the electromagnetic sensor 200 that is associated specifically with population sum signal 272.

As explained earlier with respect to FIG. 1, a processing unit and its associated TD can display the population signals of its input neurons for contributing to a population sum signal on the specific pixel locations associated with respective target neurons. The pixel locations themselves could be arranged in a matrix form with x and y coordinates associated with each position. Other ways may also be used to indicate the association between a pixel location of the TDs and the associated position on the electromagnetic sensor 200 (e.g., the location of a given population sum signal).

The electromagnetic sensor 200 may sense, observe, or detect one or more property values or one or more property types (e.g., luminous intensity) of a collective electromagnetic signal and may pass the luminous intensity to one or more associated PUs. The processing unit may then perform the computation:

$$a_1^{(l)} = \phi\left(a_0^{(l-1)}w_{0,1}^{(l)} + a_1^{(l-1)}w_{1,1}^{(l)} + a_2^{(l-1)}w_{2,1}^{(l)} + a_3^{(l-1)}w_{3,1}^{(l)} + b^{(l)}\right),$$
$$\text{where } a_0^{(l-1)}w_{0,1}^{(l)} + a_1^{(l-1)}w_{1,1}^{(l)} + a_2^{(l-1)}w_{2,1}^{(l)} + a_3^{(l-1)}w_{3,1}^{(l)}$$

as provided by the summed property values (e.g., summed luminance) displayed for each neuron and collectively detected by the electromagnetic sensor 200. In this way, the collective operation (e.g., AllReduce) may be completed in one step through the displaying and sensing of the collectively displayed electromagnetic signals (e.g., visible light). Although FIG. 2 shows a certain number and arrangement of neurons for the layers, each layer may include additional or fewer neurons. Moreover, the neurons for different layers can be supported by the same processing unit or different processing units. In addition, although FIG. 2 shows the electromagnetic sensor 200 with a certain arrangement and type of signals, the electromagnetic sensor 200 may include additional or fewer signals that are arranged differently. The electromagnetic sensor 200 itself may be a singular sensor or sensor device or may be a sensor array of many sensors or sensor devices. Additionally, the electromagnetic sensor 200 may be configured to sense one, or multiple different electromagnetic properties. For example, the electromagnetic sensor 200 may sense visible light, and may additionally include components for sensing infrared light, ultraviolet light, or any other electromagnetic signal at one or more locations of the electromagnetic sensor 200.

In addition, although FIG. 2 shows the movement of data from layer L−1 to L, the movement of data may be in the opposite direction, as well. As noted earlier, during training as part of backpropagation, model parameters are updated by backflow of error gradients. Weight and bias parameter updates are applied during backpropagation. Thus, during training as part of a backward pass a layer of an AI model provides results of the loss or error computation by neurons in that layer to the neurons for the previous layer (e.g., neurons in layer L provides the results to the neurons in layer L−1 of FIG. 2). The gradient of a loss function with respect to the weights and bias in the network (or a portion of the network) is calculated. The gradient is then fed to an optimization method that uses the gradient to update the weights to minimize the loss function. The goal with backpropagation is to update each of the weights (or at least some of the weights) in the network so that they cause the actual output to be closer to the target output, thereby minimizing the error for each output neuron and the network as a whole. As used herein, the term "population sum signal" described earlier refers to gradient of the error in the context of backpropagation while training the AI model. Conversely, in the context of inference the "population sum signal" refers to the population activation sum signal.

Figure 3:
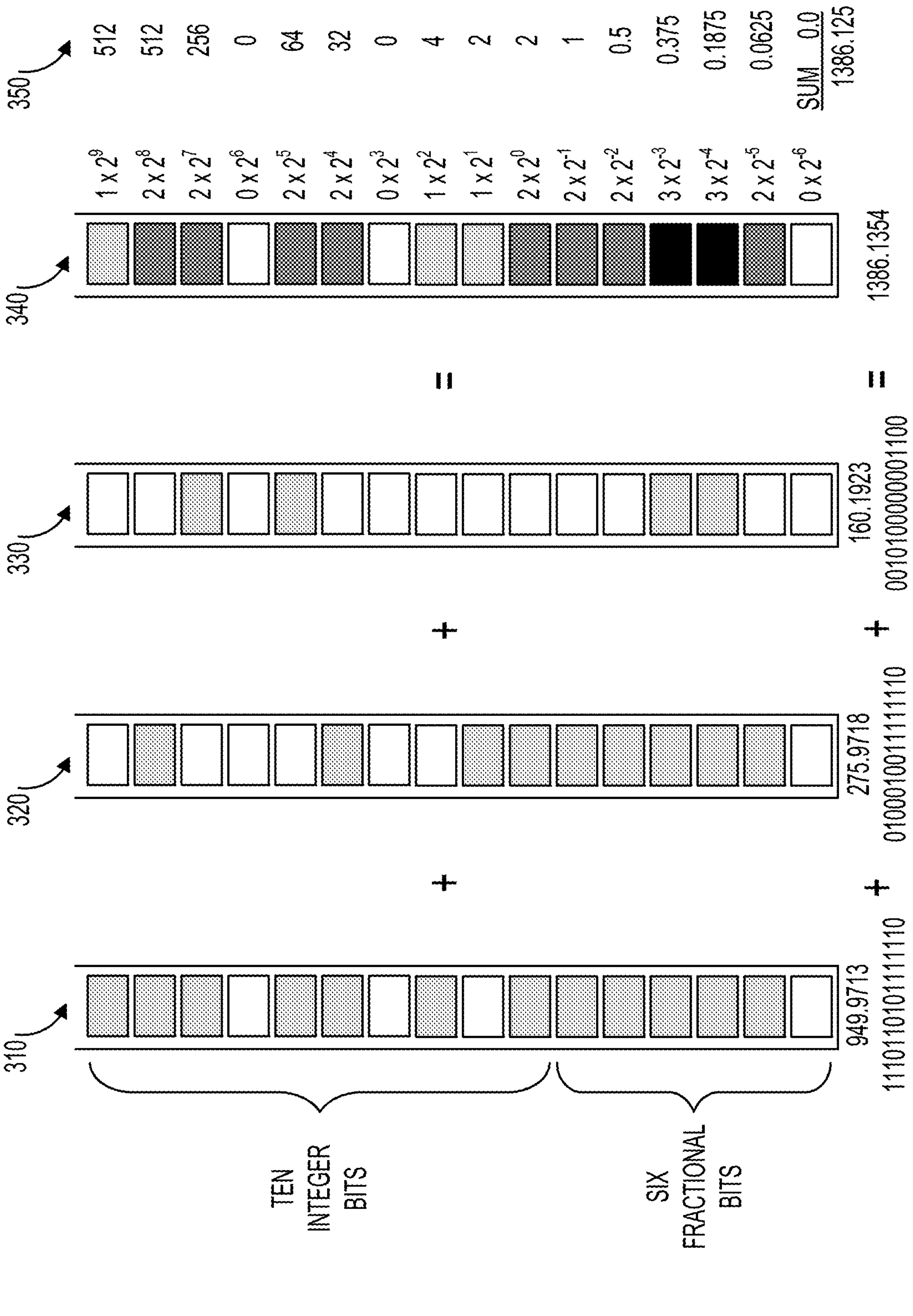
FIG. 3 shows a binary encoding and a summation technique for use as part of a collective operation, according to at least one embodiment of the present disclosure.

FIG. 3 shows a binary encoding and a summation technique 300 for use as part of a collective operation, according to at least one embodiment of the present disclosure. As part of the binary encoding and summation technique 300 individual population signals (e.g., encoded activations) for each neuron may be encoded using fixed-point integer values (or other type of value). In the example shown in FIG. 3, the fixed-point integer values include ten integer bits and six fractional bits. Column 310 corresponds to the population signal from one or more neurons of the input layer from one processing unit to one target neuron. For example, column 310 may represent the output of one of the processing units as displayed on a corresponding TD shown in FIG. 1. Column 320 corresponds to the population signal from another processing unit with input neuron(s) to the same target neuron. For example, column 320 may represent the output of another of the processing units as displayed on a corresponding TD shown in FIG. 1. Column 330 corresponds to the population signal from another processing unit with input neuron(s) to the same target neuron. For example, column 330 may represent the output of yet another of the processing units as displayed on a corresponding TD shown in FIG. 1. Column 340 shows the bitwise addition of the fixed-point integer values of columns 310, 320, and 340, which together comprise the summed weighted activations for one target neuron. Column 350 shows the associated computation when summing up the binary numbers, which equals the total activations for one target neuron. While the columns of activations are shown arranged in a line, it should be understood that the activations may be arranged in any configuration such as a grid, matrix, or other shape as displayed by the associated TDs.

As shown, the computation result or population sum signal of column 350 includes an error amount attributable to the population signals of columns 310, 320, and 330 being approximated by the fixed-point integer values. Although floating point representation of values as part of the model processing may have slightly higher accuracy, this comes at the expense of transmission bandwidth. Accuracy and bandwidth can be optimized for each use case. To simplify the processing while maintaining a reasonable dynamic range of the values, fixed-point representation of values may be used. In one example, fixed-point representation may use a set number of integer bits and fractional bits to express numbers. Fixed-point values can be efficiently processed in hardware with integer arithmetic, which may make it a preferred format for use with the systems described herein. Fixed-point format may be represented as X·Y, where X is the number of integer bits and Y is the number of fractional bits. Block-floating point (BFP) may apply a shared exponent to a block of fixed-point numbers, such as a vector or matrix. The shared exponent may allow a significantly higher dynamic range for the block, although individual block members have a fixed range with respect to each other. Quantization involving mapping continuous or high-precision values onto a discrete, low-precision grid, may be used to arrive at the fixed-point representations of the floating-point values. If the original points are close to their mapped quantization value, then one expects that the resulting computations will be close to the original computations.

Additionally, while the population signals are shown in FIG. 3 (e.g., columns 310, 320, and 330) as representing neuron activations through a 16-bit configuration, other configurations with other quantities of bits may be utilized. For example, in some embodiments, neuron activations may be represented in as few as 4 bits with a high (or at least acceptable) amount of precision and/or minimal impact to the weights and activations as implemented by the AI model. In other embodiments, activations may be configured to be represented through more than 16 bits. Indeed, any number of bits may be implemented for representing neuron activations as displayed on the TDs.

As depicted in column 340, the index location (e.g., identifiable via a row number and a column number or on a grid associated with pixels of the associated TDs) of the signals in the column corresponds to a weight of that location. As an example, the topmost entry or first index in the column for the spaces corresponding to the ten integer bits has the largest weight ($2^9$). The next entry or index below in the column for the spaces corresponding to the ten integer bits has a weight of $2^8$. The weight of each of the next entries or indices below continue to go down until the tenth integer bit in this example, which has a weight of $2^0$. The next entries or indices in column 340 correspond to the six fractional bits. These entries or indices' weights also depend on the location in the column.

As shown by the differences in the intensity of gray shading in column 340, the information for the population signals is communicated using electromagnetic energy (e.g., visible light). Thus, similar to the signals shown as part of the electromagnetic sensor 200 of FIG. 2, column 340 when observed or sensed by the electromagnetic sensor 200 can be used to communicate the population sum signal (e.g., computational result) to the electromagnetic sensor 200. In some embodiments, the population sum signal sensed by the electromagnetic sensor at column 340 may communicate the underlying collective (e.g., summed) fixed-point integer value through an encoding scheme that is based on a larger base value than the (e.g., binary) encoding of each of the population signals of columns 310, 320, and 330. For example, because each of the processors presents their population signals using a binary encoding (e.g., each bit presents a 1 or a 0, or grey or white as shown in FIG. 3), and because the population sum signal of column 340 represents a summation of the bit values at each of the index locations, the column 340 represents the resulting summation at each index location with 1 of 4 values (e.g., a white, light gray, dark gray, or black as shown in FIG. 3). Thus, the population sum signal of column 340 may relay information encoded via a base 4 encoding structure (e.g., rather than a binary system). The encoding system of the population sum signal of column 340 may be based on a base value that is n+1 the number of TD layers, or n+1 associated columns of population signals. The sensed population sum signal of column 340 may be converted into a corresponding binary object by the electromagnetic sensor or an associated processing unit to represent the population sum signal or summed activation (e.g., 1386.125) in a binary, fixed-point integer value using a binary encoding for use by the processing units or neurons in the model.

As described herein, any number of TD layers (e.g., 8) and associated columns of population signals may be implemented, and accordingly the population sum signal sensed by the electromagnetic sensor may include encoded information through any structured encoding system and being based on any numbered base value. For instance, with 8 layers of TDs and 8 associated population signals, each index location of the resulting population sum signal may have 9 (e.g., 8+1) possible values. Thus, the electromagnetic sensor may accordingly sense and receive the population sum signal in a base 9 encoding system, which may then be converted back to binary.

Although FIG. 3 shows the differences in electromagnetic property value through shades of gray, in some embodiments, colors (e.g., blue and red) can be used to communicate this information. In some embodiments, light intensity or luminosity can be used to communicate this information. Indeed, any electromagnetic property (and combinations of electromagnetic properties) may be displayed by the various TDs in order to contribute to a collective population sum signal sensed by the electromagnetic sensor. In some embodiments, color information can be used to communicate the sign (positive or negative) associated with a binary value. The receiving hardware (e.g., a sensor and ASIC processing board) and software can then parse the red and blue signals and provide them for calculation of $$a_0^{(l-1)}w_{0,1}^{(l)} + a_1^{(l-1)}w_{1,1}^{(l)} + a_2^{(l-1)}w_{2,1}^{(l)} + a_3^{(l-1)}w_{3,1}^{(l)},$$

which has been simplified through the transparent display overlay process to sum positive activations and negative activations.

Additionally, the summation technique 300 of FIG. 3 has been presented and described as an exemplary function of the systems and techniques of the present disclosure. It should be understood, however, that other collective operations in addition to or as an alternative to summation are contemplated. For example, the neuron activations may be presented via associated TDs and/or layers, and the population signals may be collectively observed by the electromagnetic sensor in order to perform other arithmetic computations such as multiplication, exponentiation, etc. For instance, certain locations or positions in a grid (or other pattern) of pixels of the TDs may be indexed to represent other mathematical operands, functions, etc. such that pixel information displayed in these indexed locations may indicate for values to be aggregated in any number of ways, for example, rather than only summation.

Figure 4:
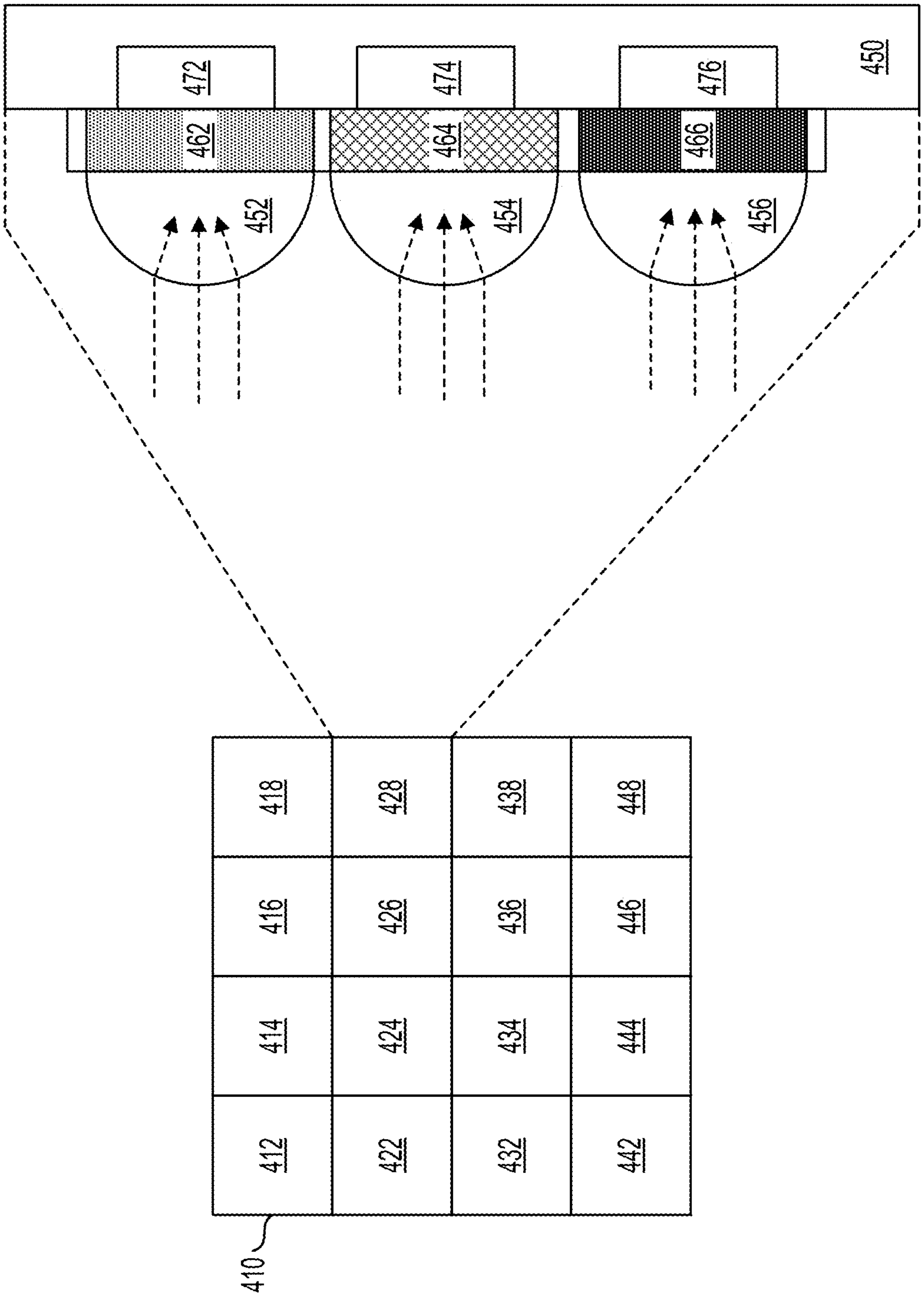
FIG. 4 shows example processing of information communicated, for performing a collective operation, via electromagnetic energy by an electromagnetic sensor on a pixel-by-pixel basis, according to at least one embodiment of the present disclosure.

FIG. 4 shows example processing 400 of information communicated, for performing a collective operation, via electromagnetic energy by an electromagnetic sensor on a pixel-by-pixel basis, according to at least one embodiment of the present disclosure. As explained earlier, intensity and color values associated with displayed (or otherwise communicated) electromagnetic energy can be used to communicate individual reference signals, population reference signals, and population sum signals for use with the neurons in the next layer of the model. As an example, FIG. 3 shows that a column (e.g., column 340 of FIG. 3) can include population sum signal values. Each item and/or index location (e.g., a rectangle or a square) in the column may indicate a value or magnitude for one or more properties of electromagnetic energy, such as intensity and color information. In this example processing 400, one such square 410 can include multiple pixels (e.g., 16 pixels, which are labeled as 412, 414, 416, 418, 422, 424, 426, 428, 432, 434, 436, 438, 442, 444, 446, and 448 in FIG. 4). Each pixel (e.g., pixel 428) can be processed using an electromagnetic sensor 450. The electromagnetic sensor 450 corresponds to a sensor for sensing one or more properties of electromagnetic energy (e.g., the electromagnetic sensor described earlier with respect to FIG. 1). The electromagnetic sensor 450 may include one or more lenses 452, 454, and 456 to focus the light onto image sensing elements 472, 474, and 476. The focused light rays may also travel through filters, such as color filters, polarization filters, etc. In this example, the filters include a red color filter 462, a green color filter 464, and a blue color filter 466. Each image sensing element generates a signal proportional to the intensity of the impinging electromagnetic energy for the specific electromagnetic property (e.g., color if visible light is used). Other filters and other sensing elements may be implemented in embodiments where other (e.g., non-visible) types of electromagnetic energy are utilized.

Alternatively, the filters can simply be configured to filter electromagnetic energy corresponding to specific wavelengths. As an example, a filter could be set to filter (allow passage of) electromagnetic energy between 600 nanometers to 610 nanometers and/or other such ranges of wavelengths. The signals captured by the image sensing elements can be further processed before being passed on to a respective processing unit (e.g., the PUs coupled to the electromagnetic sensor shown in FIG. 1) associated with the neurons in a layer. Although FIG. 4 shows a certain number and arrangement of pixels, additional or fewer pixels may be used. In addition, any number and type of lenses, filters, and sensing elements may be deployed depending on the wavelengths or other properties of the electromagnetic energy being processed. In sum, the property of the electromagnetic energy may comprise luminous intensity, color, wavelength, a polarization-related property, a fluorescence-related property, a phosphorescence-related property, a storage-related property, a reflection-related property, any other property, and combinations thereof.

Figure 5:
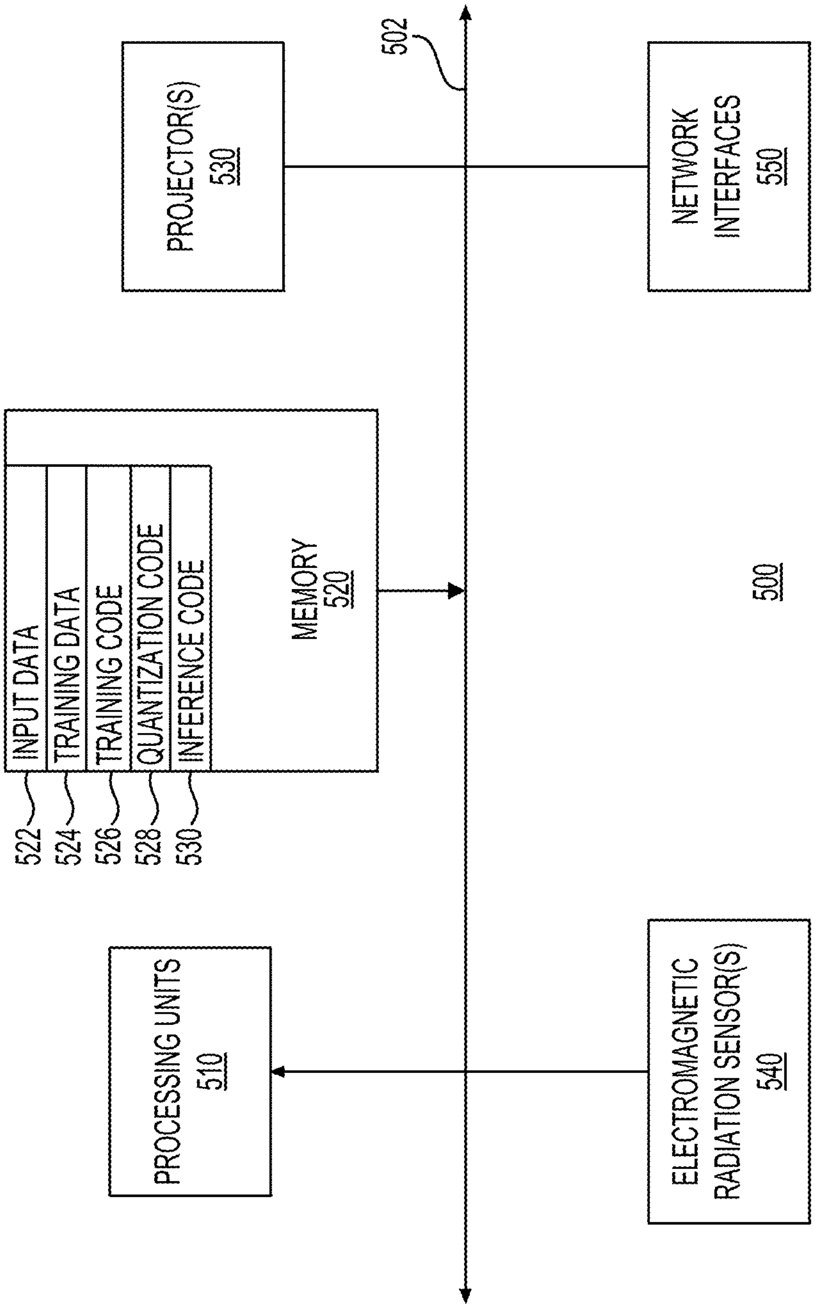
FIG. 5 shows a system for processing an artificial intelligence (AI) model, according to at least one embodiment of the present disclosure.

FIG. 5 shows a system 500 for processing an artificial intelligence (AI) model, according to at least one embodiment of the present disclosure. System 500 may include processing units 510 (e.g., similar to the processing units described earlier with respect to FIG. 1) and a memory 520. System 500 may further include transparent displays 530 (e.g., similar to the TDs described earlier with respect to FIG. 1), electromagnetic sensor(s) 540 (e.g., similar to the electromagnetic sensor described earlier with respect to FIG. 1), and network interfaces 550 interconnected via bus system 502. Memory 520 may include input data 522, training data 524, training code 526, quantization (Q) code 528, and inference code 529. Input data 522 may comprise data corresponding to images, words, sentences, videos, or other types of information that can be classified or otherwise processed using AI model. Memory 520 may further include training data 524 that may include weights and biases obtained by training the AI model. Memory 520 may further include training code 526 comprising instructions configured to train an AI model or a neural network, such as ResNet-50. Training code 526 may use the weights and biases obtained by training the neural network.

Quantization code 528 may include instructions configured to scale and quantize input data 522 or training data 524. In one example, scaling may include multiplying the data that is in a higher precision format (e.g., FP32 or FP16) by a scaling factor. Quantizing may include converting the scaled values of the data from the higher precision format to a lower precision format (e.g., an integer or a block floating point format). As explained earlier with respect to FIG. 3, the use of lower precision format data allows the use of lower bandwidth binary encoding and summation.

With continued reference to FIG. 5, memory 520 may further include inference code 529 comprising instructions to perform inference using a trained AI model or a neural network. Although FIG. 5 shows a certain number of components of system 500 arranged in a certain way, additional or fewer components arranged differently may also be used. As an example, processing units 510 may include local memory blocks, which may be cache memory, block RAM (BRAM), or other type of local memory blocks. In addition, although memory 520 shows certain blocks of code, the functionality provided by this code may be combined or distributed. In addition, the various blocks of code may be stored in non-transitory computer-readable media, such as non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media.

Figure 6:
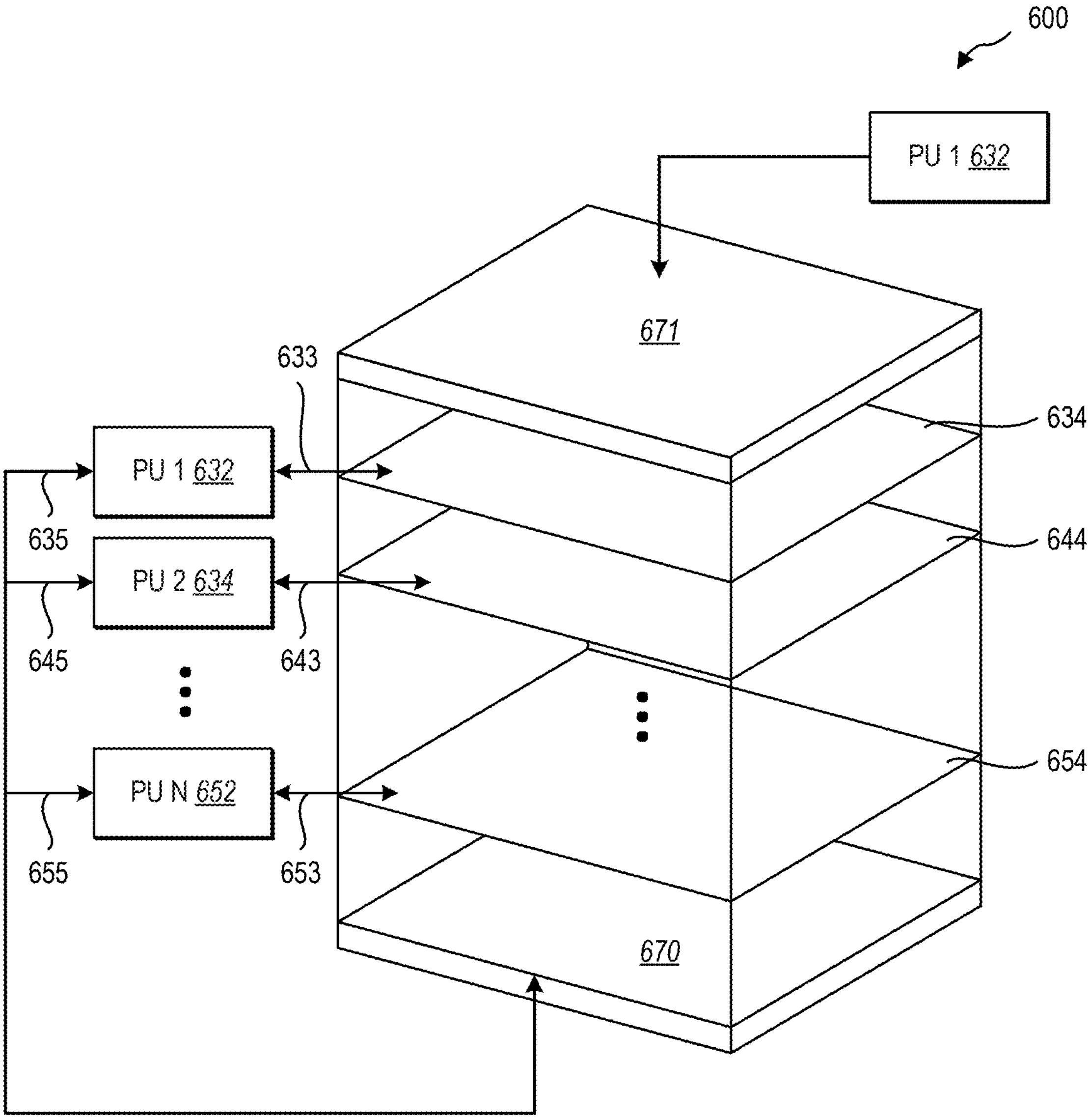
FIG. 6 shows an example system for performing a collective operation, according to at least one embodiment of the present disclosure.

FIG. 6 shows an example system 600 for performing collective operations, according to at least one embodiment of the present disclosure. The example system 600 may be implemented in the system environment of FIG. 1 (e.g., in place of or in addition to the system 130). System 600 includes a set of N PUs (e.g., N processing units PU 1 632, PU 2 642, and PU N 652). Each of the PUs can be a graphics processing unit (GPU). As explained earlier, the processing units can be implemented using other hardware options, as well. As an example, a processing unit may be implemented as one or more computer processing units (CPUs), field programmable gate arrays (FPGAs), application specific integrated circuits (ASICs), erasable and/or complex programmable logic devices (PLDs), programmable array logic (PAL) devices, or generic array logic (GAL) devices. Each of the PUs is coupled to an associated TD. For example, PU 1 632 is coupled to a TD 634 via a link 633, PU 2 642 is coupled to a TD 644 via a link 643, and PU N 652 is coupled to a TD 654 via a link 653. Each of links 633, 643, and 653 may be implemented as a display port link. Other high-speed links for connecting processing units to displays may also be used. Each of the TDs is configured to display information by presenting electromagnetic energy through various pixels of the TD.

Each of the PUs may be coupled to an electromagnetic sensor 670. For example, PU 1 632 is coupled to the electromagnetic sensor 670 via a link 635, PU 2 642 is coupled to the electromagnetic sensor 670 via a link 645, and PU N 652 is coupled to the electromagnetic sensor 670 via a link 655. Each of links 635, 645, and 655 may be implemented as a peripherals component express (PCIe) link. Other high-speed links for connecting processing units to sensors may also be used. The system 600 also includes an electromagnetic sensor 671. The electromagnetic sensor 671 may be positioned at an opposite end of the stacked layers of TDs from the electromagnetic sensor 670. The electromagnetic sensor 671 may be the same or similar sensor to the electromagnetic sensor 670. In this way, the electromagnetic sensor 671 may sense, observe, or otherwise detect the same collective electromagnetic signals from the multiple layers of TDs as the electromagnetic sensor 670. For example, a collective electromagnetic signal that is an aggregate of the information displayed on pixels of the various layers may appear or be observed with the same property values (e.g., luminosity, color, etc.) when observed from the bottom (e.g., electromagnetic sensor 670) as from the top (e.g., electromagnetic sensor 671). In this way, the cumulative electromagnetic signals resulting from the various layers of TDs may be observed and sensed by both the electromagnetic sensor 670 and the electromagnetic sensor 671.

In some embodiments, the electromagnetic sensor 671 may be coupled to one or more (or all) of PU 1 632, PU 2 642, or PU N 652. For example, the electromagnetic sensor 671 may observe and communicate the collective electromagnetic signal to the PUs in addition to the electromagnetic sensor 670. In some embodiments, the two sensors may provide redundancy or a backup, for example, in the event of a failure of one of the sensors. In some embodiments, the two sensors may facilitate calibration of the system 600, such as by comparing the detected signals of both sensors to ensure accuracy and precision. In some embodiments, the two sensors may be different sensors, and/or may be configured to observe and/or detect different electromagnetic properties. For example, the electromagnetic sensor 670 may be configured to detect luminosity and the electromagnetic sensor 671 may be configured to detect color. In this way, the two-sensor configuration may facilitate leveraging multiple properties of the electromagnetic signals for communicating and passively computing information via two or more properties of the electromagnetic signals as described herein.

In some embodiments, the two-sensor arrangement of the system 600 may provide an additional output of the collective electromagnetic signal (e.g., the computational result) to another neuron, node, or layer of the AI model. For example, the electromagnetic sensor 671 may be coupled to an additional PU 672. The PU 672 may be a PU associated with another part of the AI model, such as another target layer or node. In this way the resulting collective electromagnetic signals (e.g., population sum signals) may be detected and passed to multiple different nodes and/or layers of the AI model efficiently and quickly.

Figure 7:
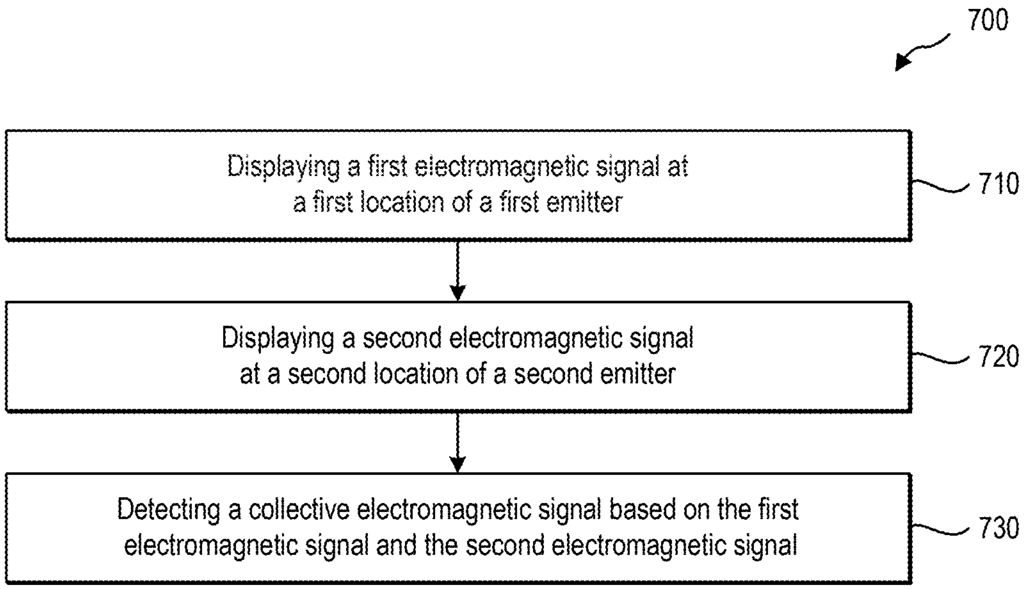
FIG. 7 illustrates a flow diagram for a method or a series of acts for performing a collective operation as described herein, according to at least one embodiment of the present disclosure.

FIG. 7 illustrates a flow diagram for a method 700 or a series of acts for performing a collective operation as described herein, according to at least one embodiment of the present disclosure. While FIG. 7 illustrates acts according to one embodiment, alternative embodiments may add to, omit, reorder, or modify any of the acts of FIG. 7. The method 700 may be performed as a method, may be performed by a system, and/or may be performed as instructions stored on a computer-readable storage medium and executable by a processor.

In some embodiments, the method 700 includes an act 710 of displaying a first electromagnetic signal at a first location of a first emitter. For example, the act 710 may include displaying, with a first emitter, a first electromagnetic signal at a first location of the first emitter based on a first processor coupled to the first emitter.

In some embodiments, the method 700 includes an act 720 of displaying a second electromagnetic signal at a second location of a second emitter. For example, the act 720 may include displaying, with a second emitter, a second electromagnetic signal at a second location of the second emitter based on a second processor coupled to the second emitter.

In some embodiments, the method 700 includes an act 730 of detecting a collective electromagnetic signal based on the first electromagnetic signal and the second electromagnetic signal. For example, the act 730 may include detecting, with an electromagnetic sensor, a collective electromagnetic signal based on the first electromagnetic signal of the first emitter and the second electromagnetic signal of the second emitter.

In some embodiments, detecting the collective electromagnetic signal includes detecting a collective electromagnetic property value of a first electromagnetic property type of the collective electromagnetic signal based on a first electromagnetic property value of the first electromagnetic property type of the first electromagnetic signal and a second electromagnetic property value of the first electromagnetic property type of the second electromagnetic signal.

In some embodiments, displaying the first electromagnetic signal at the first location of the first emitter includes displaying a first color at the first location of the first emitter, displaying the second electromagnetic signal at the second location of the second emitter includes displaying a second color at the second location of the second emitter, and detecting the collective electromagnetic signal includes detecting a third color of the collective electromagnetic signal based on the first color and the second color.

In some embodiments, displaying the first electromagnetic signal at the first location of the first emitter includes displaying a first luminosity at the first location of the first emitter, displaying the second electromagnetic signal at the second location of the second emitter includes displaying a second luminosity at the second location of the second emitter, and detecting the collective electromagnetic signal includes detecting a third luminosity of the collective electromagnetic signal based on the first luminosity and the second luminosity.

In some embodiments, the method 700 includes encoding a first set of activations for a first set of neurons of an artificial intelligence (AI) model into a first set of bit sequences, displaying, with a first set of emitters, a first set of electromagnetic signals at corresponding locations of the first set of emitters based on the first set of bit sequences, encoding a second set of activations for a second set of neurons of the AI model into a second set of bit sequences, displaying, with a second set of emitters, a second set of electromagnetic signals at corresponding locations of the second set of emitters based on the second set of bit sequences, detecting, with the electromagnetic sensor, a set of collective electromagnetic signals based on the first set of electromagnetic signals of the first set of emitters and the second set of electromagnetic signals of the second set of emitters, the set of collective electromagnetic signals exhibiting collective properties resulting from the first set of electromagnetic signals and the second set of electromagnetic signals, and transmitting the set of collective electromagnetic signals to the first processor and the second processor.

INDUSTRIAL APPLICABILITY

The following description from ¶¶ [0080]-[0100] includes various embodiments that, where feasible, may be combined in any permutation. For example, the embodiment of ¶[0080] may be combined with any or all embodiments of the following paragraphs. Embodiments that describe acts of a method may be combined with embodiments that describe, for example, systems and/or devices. Any permutation of the following paragraphs is considered to be hereby disclosed for the purposes of providing "unambiguously derivable support" for any claim amendment based on the following paragraphs. Furthermore, the following paragraphs provide support such that any combination of the following paragraphs would not create an "intermediate generalization."

In some embodiments, a computing system includes a plurality of processing units, a plurality of emitters, wherein each processing unit is coupled to a set of one or more emitters of the plurality of emitters, and wherein each emitter is configured to display an electromagnetic signal based on instructions from an associated processing unit, and at least one electromagnetic sensor configured to detect collective electromagnetic signals from the plurality of emitters.

In some embodiments, the computing system includes a plurality of transparent displays, wherein each transparent display includes a set of one or more of the emitters, and wherein the emitters are pixels of the plurality of transparent displays configured to display the electromagnetic signals at the pixels.

In some embodiments, the collective electromagnetic signal has at least one collective electromagnetic property resulting from the electromagnetic signals of two or more emitters.

In some embodiments, the electromagnetic sensor and the plurality of transparent displays are aligned such that the electromagnetic sensor is configured to detect the collective electromagnetic signal based on observing a first electromagnetic signal displayed on a first pixel of a first transparent display of the plurality of transparent displays through a second pixel of a second transparent display of the plurality of transparent displays.

In some embodiments, the electromagnetic sensor and the plurality of transparent displays are aligned such that the electromagnetic sensor is configured to detect the collective electromagnetic signal based on observing a first electromagnetic signal displayed on a first pixel of a first transparent display of the plurality of transparent displays and based on observing a second electromagnetic signal displayed on a second pixel of a second transparent display of the plurality of transparent displays, and wherein the electromagnetic sensor is configured to observe the first electromagnetic signal through the second pixel.

In some embodiments, the electromagnetic sensor and the plurality of transparent displays are aligned such that the electromagnetic sensor is configured to observe the first electromagnetic signal and the second electromagnetic signal overlaid on each other to generate the collective electromagnetic signal.

In some embodiments, the plurality of transparent displays are vertically stacked.

In some embodiments, the plurality of transparent displays are positioned such that the pixels of the plurality of transparent displays are aligned with the electromagnetic sensor.

In some embodiments, the pixels of each transparent display are aligned such that the electromagnetic sensor observes the electromagnetic signals of each pixel in a same direction.

In some embodiments, the plurality of processing units are each coupled to the electromagnetic sensor to receive the collective electromagnetic signal.

In some embodiments, the plurality of transparent displays are transparent organic LED (OLED) displays or transparent micro-LED displays.

In some embodiments, the plurality of transparent displays are transparent electronic ink displays.

In some embodiments, each of the emitters is configured to display an electromagnetic signal as a color displayed at a location of the emitter such that the electromagnetic sensor is configured to observe the collective electromagnetic signal as a resulting color displayed collectively by two or more emitters of the plurality of emitters.

In some embodiments, each of the emitters is configured to display an electromagnetic signal as a luminosity displayed at the emitter such that the electromagnetic sensor is configured to observe the collective electromagnetic signal as a resulting luminosity displayed collectively by two or more emitters of the plurality of emitters.

In some embodiments, a first emitter that is furthest from the electromagnetic sensor of a set of two or more emitters of the plurality of emitters has one or more of a higher resolution, higher power output, higher brightness, or higher intensity than one or more other emitters of the set of two or more emitters.

In some embodiments, the electromagnetic sensor is an image sensor for detecting visible light.

In some embodiments, a method for performing a collective operation includes displaying, with a first emitter, a first electromagnetic signal at a first location of the first emitter based on a first processor coupled to the first emitter, displaying, with a second emitter, a second electromagnetic signal at a second location of the second emitter based on a second processor coupled to the second emitter, and detecting, with an electromagnetic sensor, a collective electromagnetic signal based on the first electromagnetic signal of the first emitter and the second electromagnetic signal of the second emitter.

In some embodiments, detecting the collective electromagnetic signal includes detecting a collective electromagnetic property value of a first electromagnetic property type of the collective electromagnetic signal based on a first electromagnetic property value of the first electromagnetic property type of the first electromagnetic signal and a second electromagnetic property value of the first electromagnetic property type of the second electromagnetic signal.

In some embodiments, displaying the first electromagnetic signal at the first location of the first emitter includes displaying a first color at the first location of the first emitter, displaying the second electromagnetic signal at the second location of the second emitter includes displaying a second color at the second location of the second emitter, and detecting the collective electromagnetic signal includes detecting a third color of the collective electromagnetic signal based on the first color and the second color.

In some embodiments, displaying the first electromagnetic signal at the first location of the first emitter includes displaying a first luminosity at the first location of the first emitter, displaying the second electromagnetic signal at the second location of the second emitter includes displaying a second luminosity at the second location of the second emitter, and detecting the collective electromagnetic signal includes detecting a third luminosity of the collective electromagnetic signal based on the first luminosity and the second luminosity.

In some embodiments, a system includes a plurality of emitters including a first set of one or more emitters coupled to a first processor and a second set of one or more emitters coupled to a second processor, an electromagnetic sensor, and instructions stored in memory, the instructions being executable by the first processor and second processor to encode a first set of activations for a first set of neurons of an artificial intelligence (AI) model into a first set of bit sequences, display, with the first set of emitters, a first set of electromagnetic signals at corresponding locations of the first set of emitters based on the first set of bit sequences, encode a second set of activations for a second set of neurons of the AI model into a second set of bit sequences, display, with the second set of emitters, a second set of electromagnetic signals at corresponding locations of the second set of emitters based on the second set of bit sequences, detect, with the electromagnetic sensor, a set of collective electromagnetic signals based on the first set of electromagnetic signals of the first set of emitters and the second set of electromagnetic signals of the second set of emitters, the set of collective electromagnetic signals exhibiting collective properties resulting from the first set of electromagnetic signals and the second set of electromagnetic signals, and transmit the set of collective electromagnetic signals to the first processor and the second processor.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with, transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computing system comprising:

a plurality of processing units including a first processing unit and a second processing unit;

a set of emitters including a first subset of one or more emitters and a second subset of one or more emitters, wherein the first processing unit is coupled to the first subset of one or more emitters for displaying a first encoded electromagnetic signal at the first subset of one or more emitters based on instructions from the first processing unit, and the second processing unit is coupled to the second subset of one or more emitters for displaying a second encoded electromagnetic signal at the second subset of one or more emitters based on instructions from the second processing unit; wherein the first processing unit is programmed to encode the first encoded electromagnetic signal based on a first value and the second processing unit is programmed to encode the second encoded electromagnetic signal based on a second value; and at least one electromagnetic sensor configured to detect a collective electromagnetic signal from the set of emitters that is cumulative of the first encoded electromagnetic signal and the second encoded electromagnetic signal, wherein the collective electromagnetic signal is decodable into a collective value inclusive of the first value and the second value.

2. The computing system of claim 1, further comprising a plurality of transparent displays including a first transparent display and a second transparent display, wherein the first transparent display includes the first subset of one or more emitters and the second transparent display includes the second subset of one or more emitters, and wherein the emitters are pixels of the plurality of transparent displays configured to display associated electromagnetic signals at the pixels.

3. The computing system of claim 1, wherein the collective electromagnetic signal has at least one collective electromagnetic property resulting from the encoded electromagnetic signals of two or more emitters.

4. The computing system of claim 2, wherein the electromagnetic sensor and the plurality of transparent displays are aligned such that the electromagnetic sensor is configured to detect the collective electromagnetic signal based on observing the first encoded electromagnetic signal displayed on a first pixel of the first transparent display through a second pixel of the second transparent display.

5. The computing system of claim 2, wherein the electromagnetic sensor and the plurality of transparent displays are aligned such that the electromagnetic sensor is configured to detect the collective electromagnetic signal based on observing the first encoded electromagnetic signal displayed on a first pixel of the first transparent display and based on observing the second encoded electromagnetic signal displayed on a second pixel of the second transparent display, and wherein the electromagnetic sensor is configured to observe the first encoded electromagnetic signal through the second pixel.

6. The computing system of claim 5, wherein the electromagnetic sensor and the plurality of transparent displays are aligned such that the electromagnetic sensor is configured to observe the first encoded electromagnetic signal and the second encoded electromagnetic signal overlaid on each other to generate the collective electromagnetic signal.

7. The computing system of claim 2, wherein the plurality of transparent displays are vertically stacked.

8. The computing system of claim 2, wherein the plurality of transparent displays are positioned such that the pixels of the plurality of transparent displays are aligned with the electromagnetic sensor.

9. The computing system of claim 2, wherein the pixels of each transparent display are aligned such that the electromagnetic sensor observes the encoded electromagnetic signals of each pixel in a same direction.

10. The computing system of claim 2, wherein the first processing unit and the second processing unit are each coupled to the electromagnetic sensor to receive the collective electromagnetic signal.

11. The computing system of claim 2, wherein the plurality of transparent displays are transparent organic LED (OLED) displays, transparent micro-LED displays, or transparent electronic ink displays.

12. The computing system of claim 1, wherein each of the emitters is configured to display an electromagnetic signal as a color displayed at a location of the emitter such that the electromagnetic sensor is configured to observe the collective electromagnetic signal as a resulting color displayed collectively by two or more emitters of the plurality of emitters.

13. The computing system of claim 1, wherein each of the emitters is configured to display an electromagnetic signal as a luminosity displayed at the emitter such that the electromagnetic sensor is configured to observe the collective electromagnetic signal as a resulting luminosity displayed collectively by two or more emitters of the plurality of emitters.

14. The computing system of claim 1, wherein a first emitter that is furthest from the electromagnetic sensor of a set of two or more emitters of the plurality of emitters has one or more of a higher resolution, higher power output, higher brightness, or higher intensity than one or more other emitters of the set of two or more emitters.

15. The computing system of claim 1, wherein the electromagnetic sensor is an image sensor for detecting visible light.

16. A method for performing a collective operation, comprising:

receiving a first value and a second value for the collective operation;

encoding the first value with an electromagnetic encoding scheme into a first encoded electromagnetic signal representing the first value;

displaying, with a first emitter coupled to a first processor, the first encoded electromagnetic signal at a first location of the first emitter based on instructions from the first processor;

encoding the second value with the electromagnetic encoding scheme into a second encoded electromagnetic signal representing the second value;

displaying, with a second emitter coupled to a second processor, the second encoded electromagnetic signal at a second location of the second emitter based on instructions from the second processor;

detecting, with an electromagnetic sensor, a collective electromagnetic signal cumulative of the first encoded electromagnetic signal displayed by the first emitter and the second encoded electromagnetic signal displayed by the second emitter; and based on the detected collective electromagnetic signal, determining a cumulative value inclusive of the first value and of the second value.

17. The method of claim 16, wherein determining the cumulative value includes determining a sum of the first value and the second value based on decoding the collective electromagnetic signal based on the electromagnetic encoding scheme.

18. The method of claim 16, wherein:

displaying the first encoded electromagnetic signal at the first location of the first emitter includes displaying a first color at the first location of the first emitter, displaying the second encoded electromagnetic signal at the second location of the second emitter includes displaying a second color at the second location of the second emitter, and detecting the collective electromagnetic signal includes detecting a third color of the collective electromagnetic signal based on the first color and the second color.

19. The method of claim 16, wherein:

displaying the first encoded electromagnetic signal at the first location of the first emitter includes displaying a first luminosity at the first location of the first emitter, displaying the second encoded electromagnetic signal at the second location of the second emitter includes displaying a second luminosity at the second location of the second emitter, and detecting the collective electromagnetic signal includes detecting a third luminosity of the collective electromagnetic signal based on the first luminosity and the second luminosity.

20. A system, comprising:

a plurality of emitters including a first set of one or more emitters coupled to a first processor and a second set of one or more emitters coupled to a second processor;

an electromagnetic sensor; and instructions stored in memory, the instructions being executable by the first processor and second processor to:

encode a first set of activations for a first set of neurons of an artificial intelligence (AI) model into a first set of bit sequences;

display, with the first set of one or more emitters, a first set of electromagnetic signals at corresponding locations of the first set of one or more emitters based on the first set of bit sequences;

encode a second set of activations for a second set of neurons of the AI model into a second set of bit sequences;

display, with the second set of one or more emitters, a second set of electromagnetic signals at corresponding locations of the second set of one or more emitters based on the second set of bit sequences;

detect, with the electromagnetic sensor, a set of collective electromagnetic signals based on the first set of electromagnetic signals of the first set of one or more emitters and the second set of electromagnetic signals of the second set of one or more emitters, the set of collective electromagnetic signals exhibiting collective properties resulting from the first set of electromagnetic signals and the second set of electromagnetic signals; and transmit the set of collective electromagnetic signals to the first processor and the second processor.

* * * * *